(12) United States Patent
Wilhelm

(10) Patent No.: US 12,103,203 B2
(45) Date of Patent: Oct. 1, 2024

(54) DEVICE, KIT AND METHOD FOR TREATING BULK PRODUCTS

(71) Applicant: Helios Gerätebau für Kunststofftechnik GmbH, Rosenheim (DE)

(72) Inventor: Klaus Wilhelm, Rosenheim (DE)

(73) Assignee: Helios Gerätebau für Kunststofftechnik GmbH, Rosenheim (DE)

( * ) Notice: Subject to any disclaimer, the term of this patent is extended or adjusted under 35 U.S.C. 154(b) by 623 days.

(21) Appl. No.: 17/297,510

(22) PCT Filed: May 26, 2020

(86) PCT No.: PCT/EP2020/064535
§ 371 (c)(1),
(2) Date: May 27, 2021

(87) PCT Pub. No.: WO2021/001090
PCT Pub. Date: Jan. 7, 2021

(65) Prior Publication Data
US 2022/0032505 A1 Feb. 3, 2022

(30) Foreign Application Priority Data
Jul. 4, 2019 (DE) .......................... 102019118093.7

(51) Int. Cl.
*B29C 45/28* (2006.01)
*B02C 23/20* (2006.01)
(Continued)

(52) U.S. Cl.
CPC .......... *B29B 17/0005* (2013.01); *B02C 23/20* (2013.01); *B29B 13/10* (2013.01);
(Continued)

(58) Field of Classification Search
CPC ..... B29B 17/0005; B29B 13/10; B02C 23/20; B29C 45/18; B65G 53/46; B65G 53/60;
(Continued)

(56) References Cited

U.S. PATENT DOCUMENTS

| 2,734,782 A | 2/1956 | Galle |
| 3,521,407 A | 7/1970 | Nalley et al. |

(Continued)

FOREIGN PATENT DOCUMENTS

| CN | 206857425 | 1/2018 |
| CN | 109890519 | 6/2019 |

(Continued)

OTHER PUBLICATIONS

DE 102016119827 machine translation from ESpaceNet accessed Nov. 21, 2023 (Year: 2018).*

*Primary Examiner* — Cedrick S Williams
*Assistant Examiner* — Erica Hartsell Funk
(74) *Attorney, Agent, or Firm* — Head, Johnson, Kachigian & Wilkinson, PC

(57) ABSTRACT

In order to be able to operate a dust separator with or without a lower closure element (44), the closure element (44) is part of a separate closure unit (40) which is mounted under the dust separator if required. For this purpose, the dust separator, the closure unit (40) and optionally further components, such as a delivery flow generator, are kept available in a kit so as to be able to assemble the treatment unit as required. The dust separator can be operated in batches by means of the closure element (44).

24 Claims, 9 Drawing Sheets

Figure 1B:
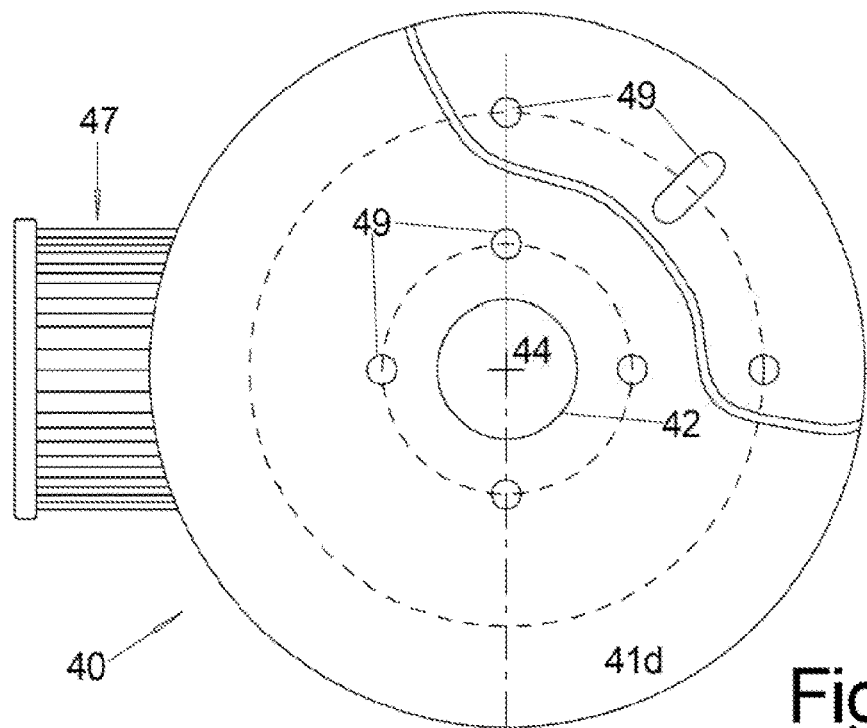

(51) Int. Cl.
  *B29B 13/10* (2006.01)
  *B29B 17/00* (2006.01)
  *B29C 45/18* (2006.01)
  *B65G 53/46* (2006.01)
  *B65G 53/60* (2006.01)

(52) U.S. Cl.
  CPC ............ *B29C 45/18* (2013.01); *B65G 53/46* (2013.01); *B65G 53/60* (2013.01); *B65G 2201/042* (2013.01)

(58) Field of Classification Search
  CPC . B65G 2201/042; B65G 65/30; B65D 88/022
  See application file for complete search history.

(56) References Cited

U.S. PATENT DOCUMENTS

| | | | |
|---|---|---|---|
| 3,799,367 A | | 3/1974 | Grewer |
| 5,961,054 A | * | 10/1999 | Nishibori ............... B29B 13/10 241/19 |
| 6,045,348 A | * | 4/2000 | Kinoshita ............... B29C 45/18 366/76.1 |
| 2015/0151229 A1 | | 6/2015 | Macgregor |

FOREIGN PATENT DOCUMENTS

| | | | | |
|---|---|---|---|---|
| DE | 342197 | | 8/1920 | |
| DE | 2041230 | | 3/1971 | |
| DE | 3302657 | | 8/1984 | |
| DE | 102014113280 | | 3/2016 | |
| DE | 102016119827 | | 4/2018 | |
| DE | 102016119827 A1 | * | 4/2018 | ............ B07B 11/04 |
| EP | 0117397 | | 9/1984 | |
| EP | 0166959 | | 1/1986 | |
| EP | 2711097 | | 3/2014 | |
| GB | 2333488 A | * | 7/1999 | ............ B29B 13/065 |
| JP | S4719974 | | 11/1972 | |
| JP | 61-60522 | | 3/1986 | |
| WO | WO90/02643 | | 3/1990 | |

* cited by examiner

DEVICE, KIT AND METHOD FOR TREATING BULK PRODUCTS

I. FIELD OF APPLICATION

The invention relates to the treatment of bulk materials, in particular the removal of the dust contained in bulk materials, in particular by ionization, since the dust often adheres to the granules by means of electrostatic charge.

II. TECHNICAL BACKGROUND

Particularly in plastics technology, but also in pharmaceuticals and food technology, raw materials in the form of bulk materials—for example granulates, regrind, coarse powders or similar—often have to be handled, e.g. transported, and treated, e.g. dried and/or dedusted. For the purposes of the present notification, all bulk materials are referred to by the abbreviating term "granules".

Especially the transport of these bulk materials is often carried out by means of pneumatic conveying, especially by means of flight conveying, in which the granulate is brought to the desired place by means of air flow and mostly flying along with it through conveying pipes.

The granulate should be as clean as possible for use in a consumer, for example for use as raw material in a plastic injection moulding machine, and in particular should not be contaminated with dusty impurities. These dust-like impurities may consist of foreign material that was unintentionally added to the granulate during production or transport, or they may also be dust-like particles of the same material as the granulate itself, which may also be undesirable depending on the subsequent use.

Dust or dust-like impurities within the meaning of this description should preferably have a particle size whose diameter is at most $1/10$, better at most $1/30$ better at most $1/100$, better at most $1/1000$ of the diameter of a granular grain.

Therefore, the general objective is to separate such granules from the dust content before use.

Various techniques are available for this purpose, ranging from simple sieving, separation of the transport air from granulate and filtering of the transport air to fraction separation by means of a cyclone.

One of the problems encountered is the strong adhesion of dust particles and granulate particles to each other, but also the adhesion of dust particles to parts of equipment such as conveying lines or granulate containers.

This strong adhesion is often caused by electrostatic charge, so that removal of the dust by mechanical means can usually only be carried out once these binding forces have been removed.

In principle, this is known to be possible by statically discharging the differently charged and thus attracted parts, in this case dust particles on the one hand and granulate particles on the other hand, for example by grounding one fraction.

In practice, however, this is difficult in the case of a very large number of very small particles, as in the present case.

For example, attempts have already been made to separate the granulate by constantly whirling it up in the deducting container closed at the bottom and bringing it into intimate contact with ionised air. This can; however, cause further abrasion and thus dust simply by the collision of granules.

Furthermore, an attempt was made to extract the dust-laden air via an air outlet opening and not to force it out by means of overpressure, whereby the air outlet opening was closed by a sieve which a granulate grain could not penetrate.

In addition, the granulate must often be dried before use in a consumer such as an injection moulding machine in order to reduce the amount of moisture it contains, above all to such an extent that no cavities caused by vapour formation are created in the moulded part during injection moulding.

If necessary, the dryer is the last processing station for the granulater s before the consumer, and often mounted directly on the consumer's granulate inlet. Depending on whether drying of the granulater s is necessary or not, the dust collector is either mounted on the dryer or directly on the granulate inlet of the consumer.

III. DESCRIPTION OF THE INVENTION a) Technical Object

It is therefore the object according to the invention to provide a closure unit as well as a kit with several modules for the construction of a treatment unit, which comprises at least the closure unit and a dust extractor which can be combined with it for the extraction of dust from a granulate, whereby the assemblies are very compact and lightly constructed, and from which the desired treatment unit can be easily assembled and mounted upstream of a consumer.

b) Achievement of the Object

This object is solved by the features of claim 1. Advantageous embodiments result from the subclaims.

Depending on the type of pre-treatment and/or post-treatment of the granulate, the granulate outlet opening of the deduster must or must not be closable, for example to be able to operate the deduster continuously in one mode and batchwise in the other.

It has been found that it is not optimal to always install a closure element integrated into the deduster at the granulate outlet opening and simply leave it open if the desired type of operation of the treatment unit requires a permanently open granulate outlet opening of the deduster.

The basic idea of the invention is therefore to provide a closure element for the granulate outlet of the deduster in the form of a separate closure unit which can be mounted under the deduster or also used at another location, which has further advantages, for example because the housing of the closure unit represents an additional intermediate container for granulate, and also with regard to easier maintenance and repair of the entire treatment unit.

In order to be able to configure the treatment unit individually in a simple way and from a few modules, depending on the application and desired mode of operation of the treatment unit, and thus with low stock levels at the manufacturer, a modular system is very useful, which contains the required modules that are specifically designed for free mutual combinability.

This means that the individual modules, in particular their connecting elements for mutual connection, are specifically construed in such a way that the modules can be quickly and easily attached to one another, in particular to one another, in such a way that they can cooperate as a treatment unit in this assembled state, i.e. in particular that the lower granule outlet opening of an upper module overlaps, in particular is aligned with the upper granule inlet opening of a module mounted below it, whereby the number and sequence of the modules for the treatment unit can be freely selected according to the application, in particular deduster on closing unit, this if necessary on a dryer or
deduster on dryer or
dryer on sealing unit, whereby such a treatment unit can be mounted on a consumer.

The deduster has—as known—a dedusting container with at least one granulate inlet opening and one granulate outlet opening as well as an air outlet opening for removing, in particular by suction, the air together with the dust to be removed.

If—as is known—the granulate is to be transported to the dust collector by means of a conveying air flow, a conveying flow generator is required, in particular in the form of an ejector compressed air nozzle with a compressed air connection, which can also form a module of the modular system.

The granule inlet opening and/or the air outlet opening will preferably be located in the upper part of the deduster, especially in the upper half or upper third, one of which, especially the air outlet opening, will preferably be located in the upper lid of the deduster container.

The granulate outlet opening, on the other hand, will be located in the lower area, especially in the lower third or preferably in the bottom of the dedusting container.

Furthermore, a known deduster comprises a whirling unit for whirling the granulate in the dedusting container by injecting compressed air, as well as a control system, in particular an electronic control system, which is capable of controlling the entire deduster, in particular an entire treatment unit comprising such a deduster, i.e. in particular all moving parts, in particular valves and/or all pneumatically or electrically or electronically functioning parts thereof.

However, according to the invention, the deduster does not include a closure element for the granulate outlet opening that can be activated and deactivated.

Instead, the deduster comprises connecting elements, in particular screw openings, in the lower area for—preferably direct—connection to a component arranged below, for example a closure element which can close the granulate outlet opening of the deduster.

A separate closure unit accordingly comprises a closure element which can be activated and deactivated at one of the granule openings, in particular at its upper granule inlet opening for the granule flow coming from the upstream module—in particular, but not only—a granule flow passing through from a dust extractor.

In addition to a granulate inlet opening for the granulate in the upper part of the housing, in particular in its lid plate, the closure unit comprises a granulate outlet opening in the lower part of the housing, as well as connecting elements, in particular screw openings, in the upper and lower areas of the housing, which are constructed in such a way that they can be used for quick and easy connection to a component arranged above or below.

The closure element is preferably constructed and arranged in the housing in such a way that it can close a granulate passage opening present in the upper area of the closure unit or above the closure unit, in particular from its underside.

This granule passage opening can be the own granule inlet opening of the closure unit in its upper area. This granulate inlet opening is preferably formed in a lid plate, which is arranged on a sleeve-shaped housing part of the closure unit, preferably in a dismountable manner, for example in order to be able to mount lid plates with granulate inlet openings of different sizes as required.

In this way, the granulate inlet opening of the closure unit can be adapted to the granulate outlet opening of a module arranged above it. The two openings can, for example, be selected to be of equal size.

However, the granule passage opening can also be directly the granule outlet opening of a module mounted above it, such as the deduster, which can close the closure unit. In this case, the lid on the closure unit may not be necessary and can be left out.

Preferably the closure element is an upwardly projecting closure element such as a closure hemisphere or a closure cone, which in the closed state preferably projects upwards through the upper granulate inlet opening of the closure unit and preferably projects into the module mounted directly above it through a granulate outlet opening there, for example.

If the upwardly projecting closure element, such as the closure cone, is not intended to close the granule inlet opening of the closure unit, but directly this granule outlet opening of the module arranged above it, it only needs to have a predetermined contour with a predetermined size range to close the upwardly projecting closure element.

This makes it easier to combine with various attached modules that have slightly different sized granule openings to be closed at their lower end.

For a tight annular system, the upwardly projecting closure element, in particular the closure cone, is mounted on a closure element base so as to be pivotable about at least one horizontal axis, preferably about two intersecting horizontal axes.

Preferably, the housing has at least one circumferential wall forming the sleeve-shaped housing part, and an upper and a lower mounting flange projecting radially outwards from it, which facilitates connection to components located above and below it.

Furthermore, there is preferably an air opening in the housing, especially in its circumferential wall, to which an air filter is attached in a fluidically sealed manner in order to filter air flowing through it. In this way, for example, a gas, preferably air, which reaches the closure unit from the module arranged above or below it, for example a granulate dryer arranged below it, can flow out, so that the air opening then functions as an air outlet opening.

Similarly, ambient air could flow into the closure unit and from there into a module mounted below and/or, when the closure element is open, into the module mounted above, if this is necessary for the operation of this adjacent module.

As a rule, the closure unit also has its own, preferably electronic, control system that controls the closure element. This control unit has signal connections—especially in the form of a male/female plug connection or as a clamp, especially screwed clamp—for connecting it in particular to another control unit, for example to the control unit of the deduster, whereby said other control unit can then act as the master control.

The control of the closure element and/or the deduster can also include a shredder control:

If the treatment unit supplies granulate to an injection moulding machine as a consumer, the waste products produced on the injection moulding machine should be returned to the consumer and previously to the treatment unit.

The waste products are mainly sprue parts or reject products. These are fed into a shredder to shredder them to a size not substantially larger than the size of the granules, so that they can be fed back to the dust collector via the granule inlet opening.

The shredder control contains an input option for the length of the time interval in which the mill should be emptied and the ground waste products returned to the granulate inlet of the dust collector, especially so that the ground material in the mill is not ground too finely.

The shredder control can also have an operating element for immediate, onetime emptying of the shredder. The actuating element as well as the input facility are preferably provided on the housing of the control unit of the closure unit.

The modular system can also include, for example, the granulate dryer mentioned above as a further component.

This usually has an approximately cylindrical, upright, approximately sleeve-shaped housing with an upper granulate inlet opening and a lower granulater outlet opening, as well as an inlet opening in the lower area, through which warm and/or dry drying air can be introduced in order to flow through the granulate inside the granulate dryer and dry them. The lower granulate outlet opening is usually directly or indirectly closable by a controllable closure element.

As a rule, the outlet opening on the one hand and the inlet opening on the other are located in the lower and upper front side.

If the granulate dryer is mounted directly below the closure unit, the granulate outlet of the closure unit should be completely inside the granulate inlet of the dryer when mounted, especially both should be concentric or identical.

The housing of the granulate dryer also has connecting elements at both the upper and lower ends, which are designed for quick and easy connection to a module mounted on top of it or to a module below. The upper connecting elements, especially in the form of screw openings, should be arranged in such a way that the above-described overlapping or covering of the openings is given with another module sitting on top of it.

The bottom fasteners should preferably be as universal as possible, as a granulate dryer often has to be placed and fixed directly on a consumer, but there is a large variety of them, which probably cannot all be fixed with a single universal design of the bottom fasteners.

In that case, an adapter with a lowest possible axial height, in particular a plate-shaped, in particular ring-shaped adapter, between the lowest module of a treatment unit, for example the granule dryer, and the consumer is useful, which in turn has two types of fasteners, one of which can interact with the fasteners of the module mounted on it and the other with the fasteners of the consumer below. The two different types of fasteners may also differ only by their position on or in the adaptor.

The adapter can also be used to be inserted between two modules of the treatment unit. However, in the context of a kit where all modules of the kit come from the supplier of the kit itself, an adapter between the modules should not be necessary.

Furthermore, the construction kit may also include an intermediate tank, which essentially consists only of a vertically continuous open, e.g. conical or sleeve-shaped housing with connecting elements in the upper and lower area for connection to a component arranged above or below it, for example a module of the kit or a consumer arranged below it.

The purpose of such an intermediate tank is to make the interior space available as an additional buffer space for granulate, which may be necessary, for example, for a downstream inlet opening of an injection moulding machine, which is located below it, especially if the entire treatment unit does not include a closure unit.

Such a buffer space is of course also contained in the closure unit, which is not, however, to be understood as a surge tank for the purpose of this description. An surge tank is only to be understood as one that does not have a closure unit in its upper area, in particular does not have any closure element at all.

The modular system can also be equipped with a further module, a flow generator, which can be connected to the granulate inlet of the dust collector and generates an air flow in order to transport the flying granulate and to introduce it into the dust collector.

Such a conveyor flow generator can in particular be a compressed air driven ejector compressed air nozzle, which must accordingly have a compressed air connection, and in particular can be arranged in a suction lance which can be inserted into a granulate supply in order to suck granulate from it.

The kit can also include a dust collector as an additional module, as it can be used to separate the dust from the exhaust air leaving the dust collector and can be connected to the air outlet of the dust collector accordingly.

Such a dust separator may in particular include an exhaust air filter.

Such a dust collector can also have its own vacuum generator to transport the dust-laden air to the dust collector, for example, a compressed air-driven ejector compressed air nozzle.

Such an ejector compressed air nozzle shoots the applied compressed air at a high flow rate into a conveyor line, for example, whereby ambient air is sucked in by the resulting negative pressure and also entrains and transports any granulate present at the inlet.

C) Exemplary Embodiments

Figure 1A:
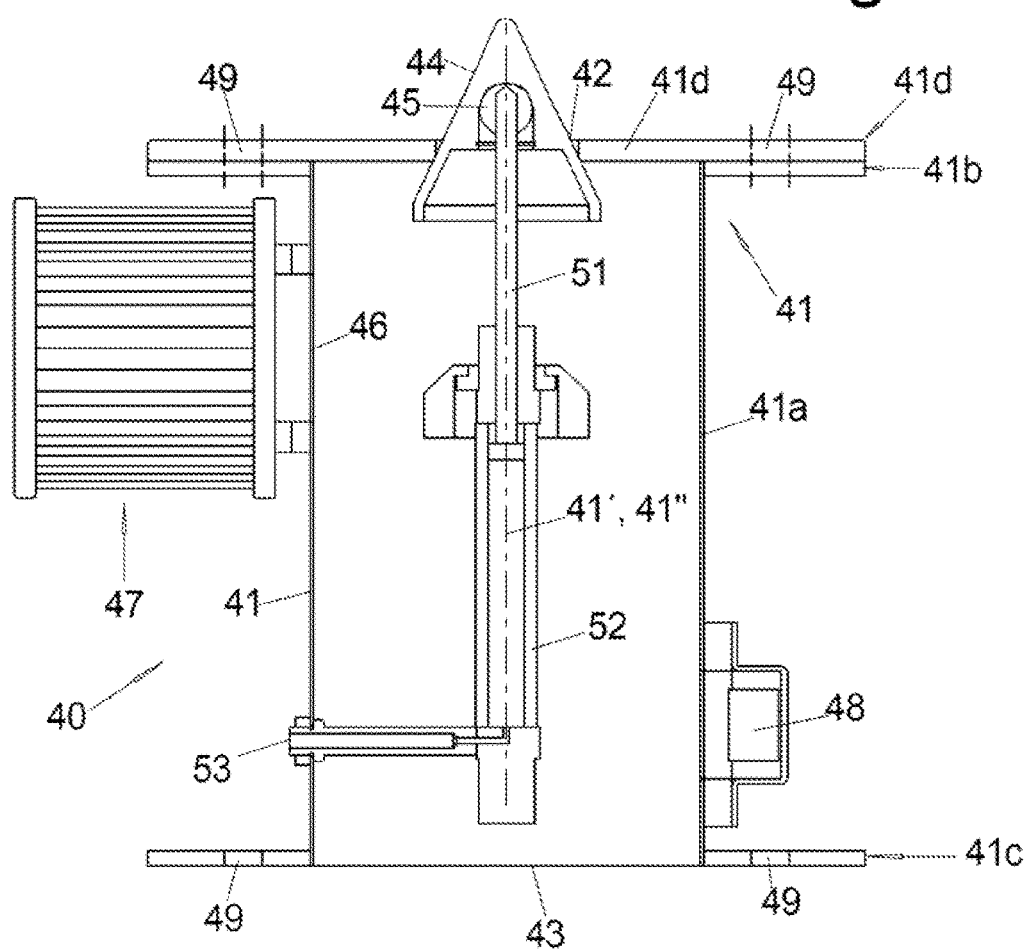
Figure 1C:
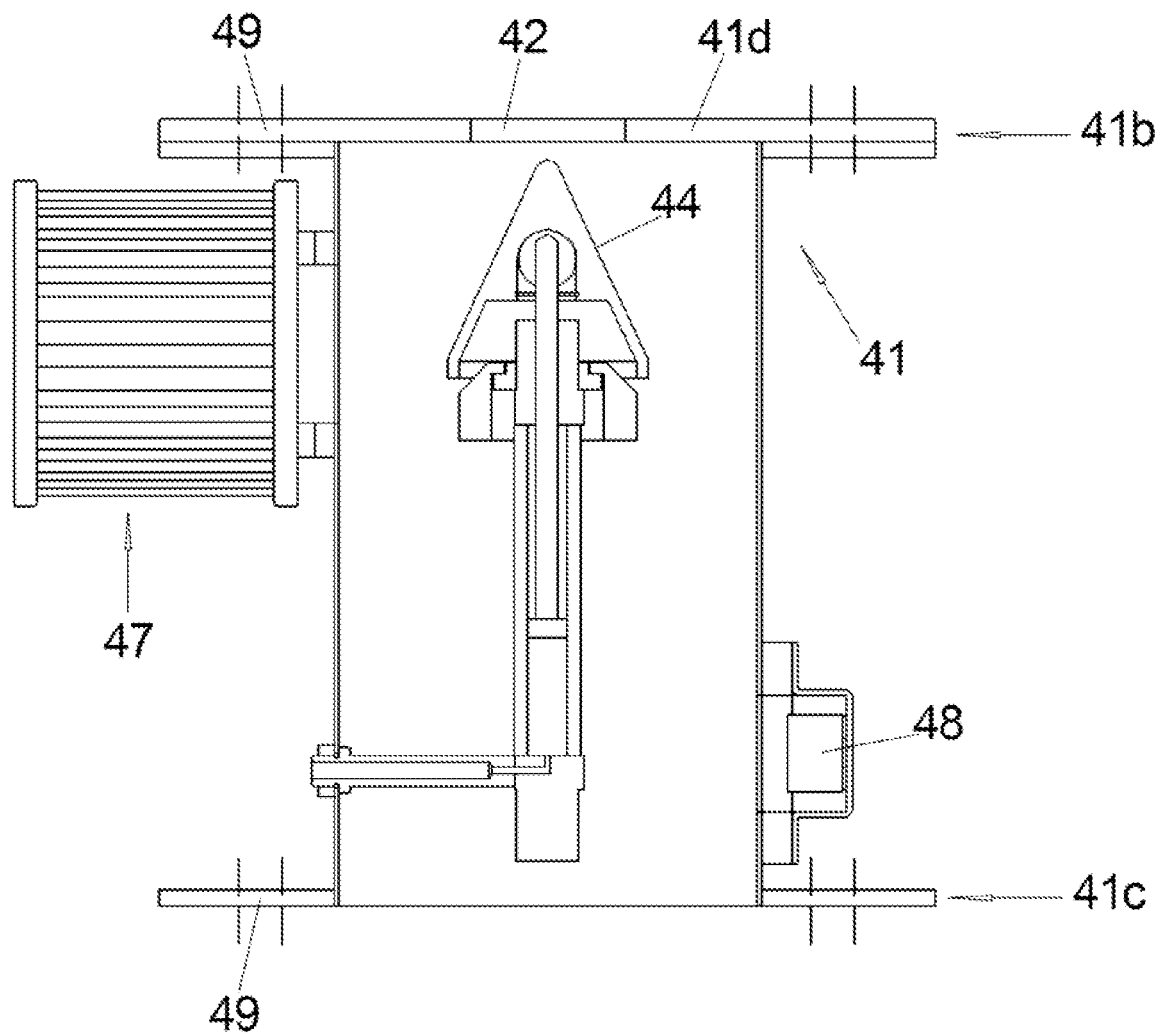
Figure 2A:
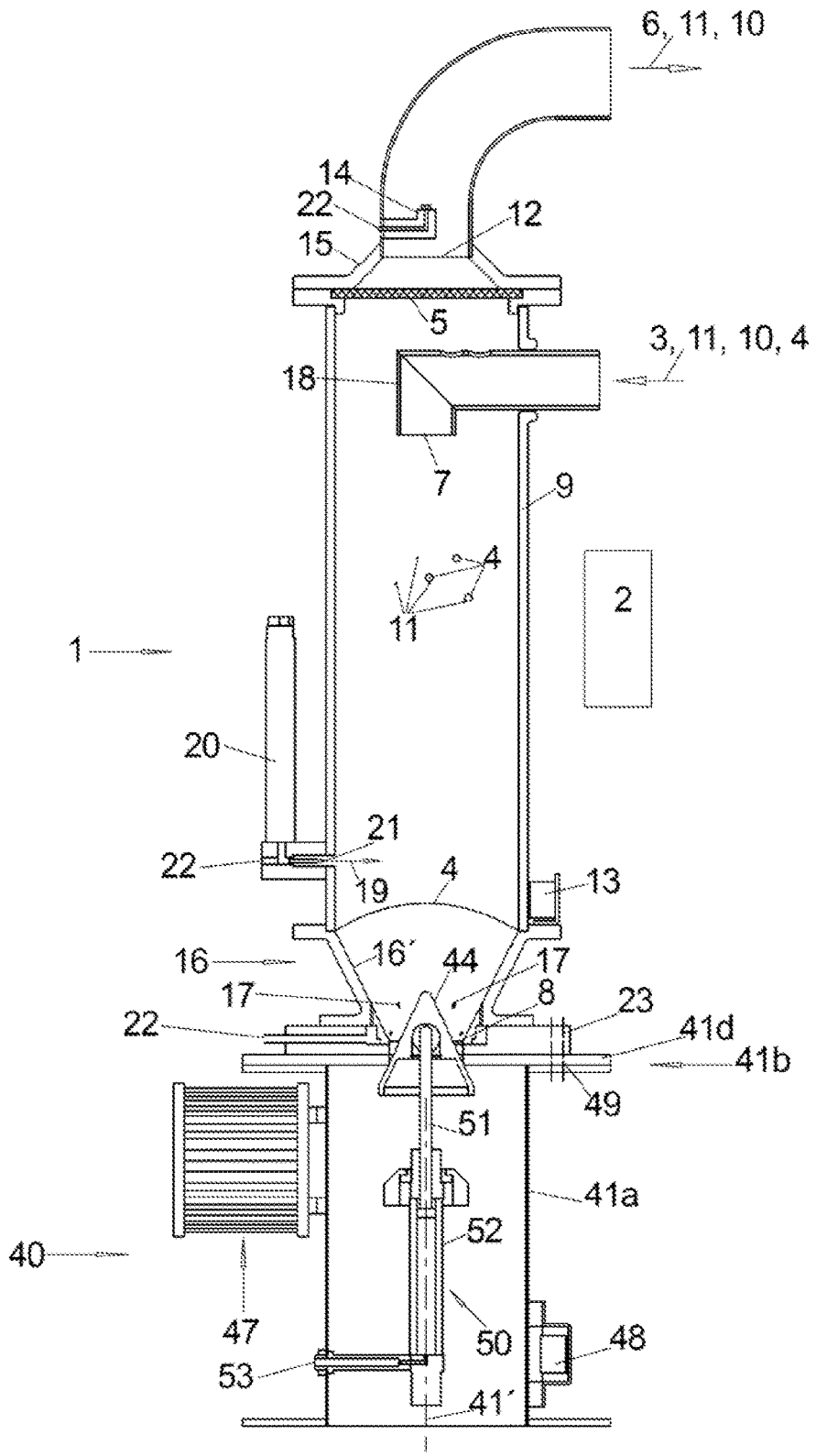
Figure 2B:
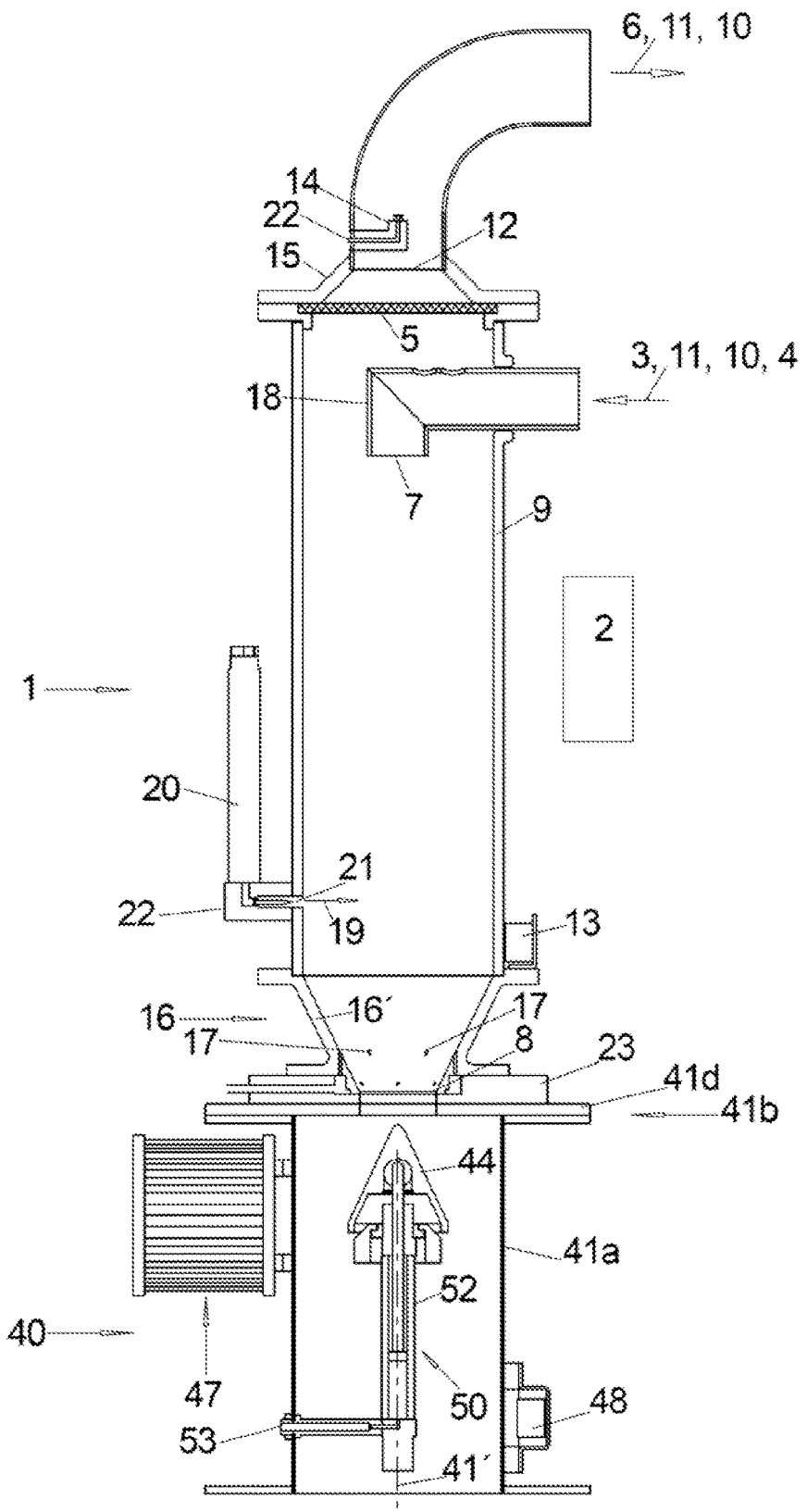
Figure 3A:
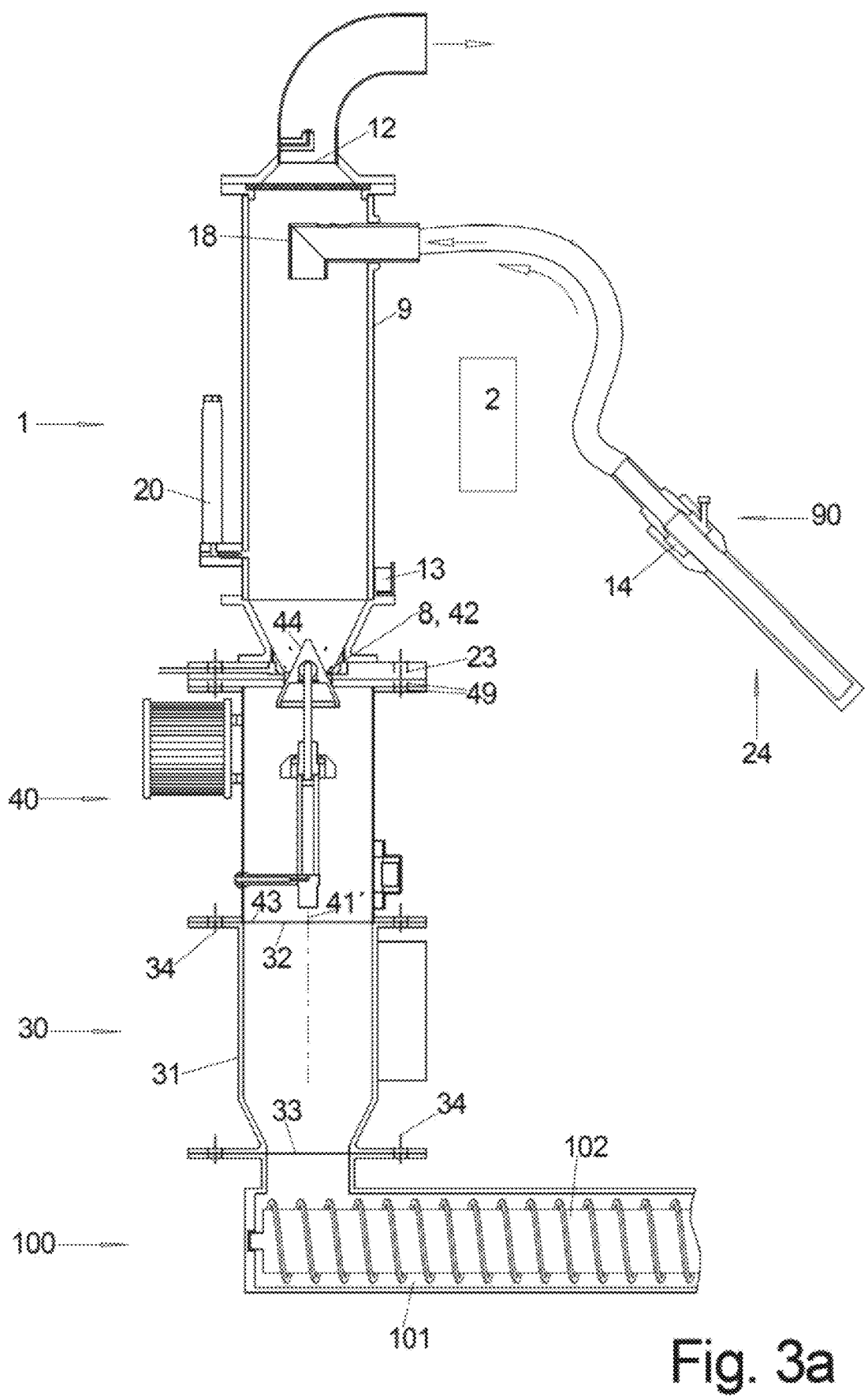
Figure 3B:
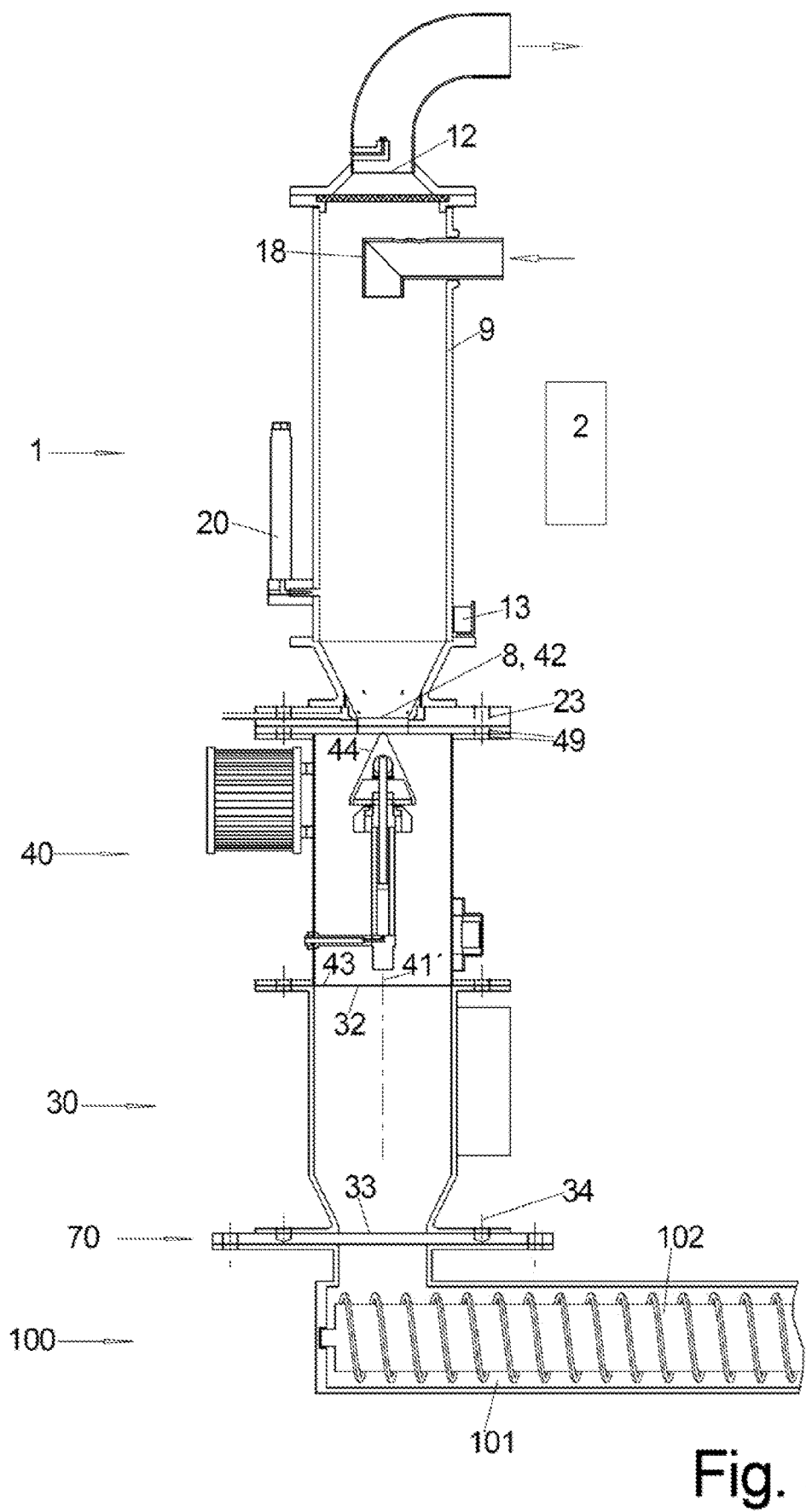
Figure 4A:
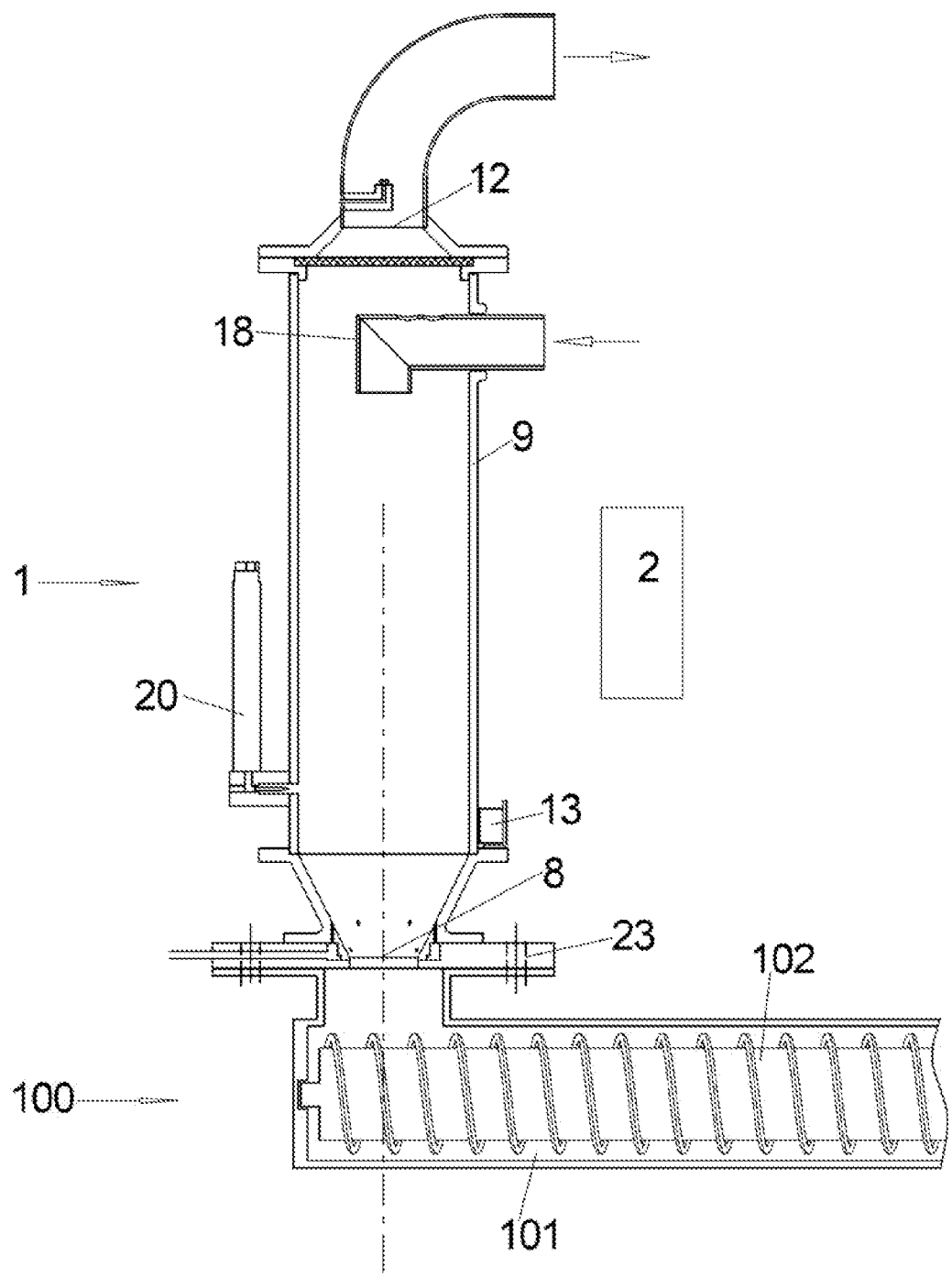
Figure 4B:
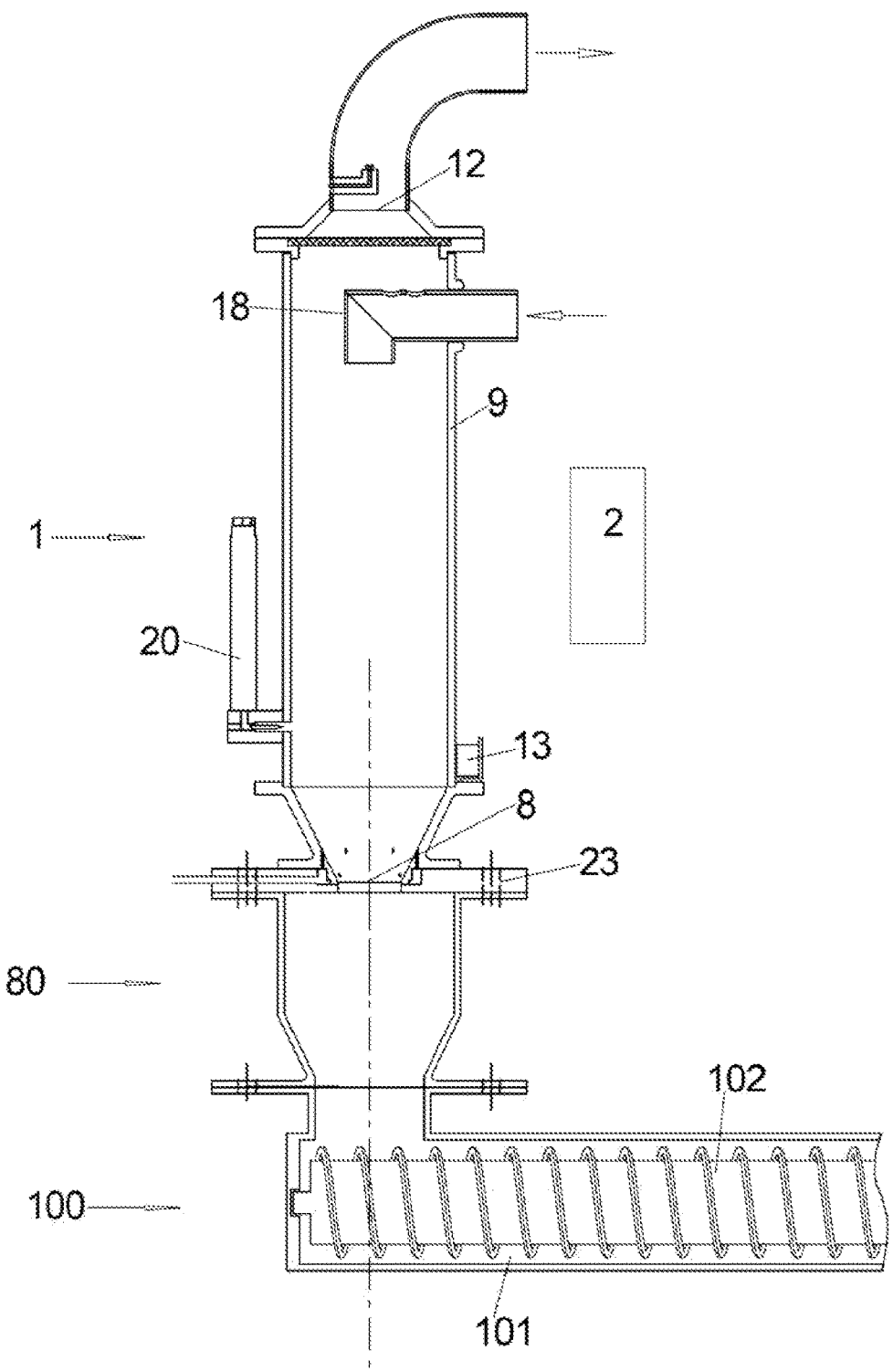
Figure 4C:
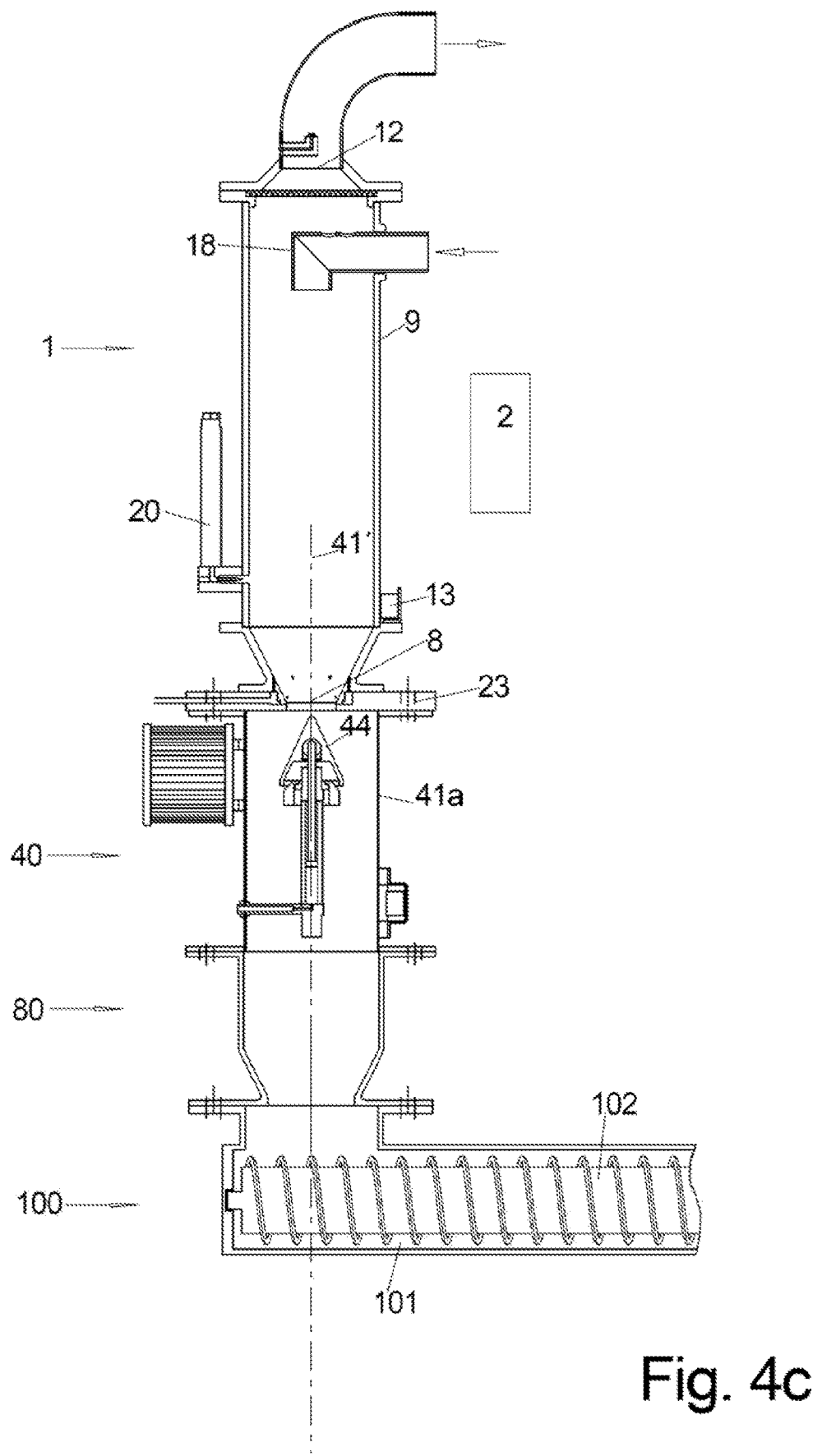

An embodiment of a treatment unit and its modules for separating a granulate from the conveying air as well as deducting the granulate according to the invention is described in the following by means of the figures in different functional states as examples. It shows:

FIG. 1*a, b*: a closure unit according to the invention with closed granulate inlet opening in vertical section as well as in top view, FIG. 1*c*: the closure unit as shown in FIG. 1*a, b* again in vertical section with the granulate inlet opening open, FIG. 2*a*: a treatment unit consisting of a dust extractor mounted on the closure unit with the granulate inlet of the closure unit closed, FIG. 2*b*: the treatment unit according to FIG. 2*a* with open granule inlet of the closure unit, FIG. 3*a*: a treatment unit consisting of a deduster mounted on the closure unit and a granule dryer mounted underneath it, which is mounted on a consumer downstream thereof, wherein the granule inlet opening of the closure unit is closed, FIG. 3*b*: the treatment unit according to FIG. 3*a* with open granule inlet opening of the closure unit, but an additional adapter between granule dryer and consumer, FIG. 4*a*: a treatment unit consisting of only one deduster mounted on a consumer located below, FIG. 4*b*: a treatment unit as shown in FIG. 4*a*, but with an additional intermediate tank between the deduster and the consumer, FIG. 4c: a treatment unit as shown in FIG. 4b, but with a sealing unit between the deduster and the intermediate container.

FIGS. 1a to c show the closure unit 40 as a single part:

The housing 41 of the closure unit 40 comprises, viewed in the axial direction 41', usually in the mounted state of vertical, a circumferential, polygonal, in particular rectangular, or rotationally symmetrical circumferential wall 41a, which surrounds an interior space open at the top and bottom, and from the upper end of which an annular, upper mounting flange 41b projects outwards and from the lower end of which an annular, lower mounting flange 41c, in particular identical to the upper one, projects outwards.

A lid plate 41d which could also be the mounting flange 41b at the same time—rests on the upper mounting flange 41b and is detachably connected to it, preferably screwed, in which, preferably centrally, a granulate inlet opening 42 is formed, which is considerably smaller, has about half the diameter of the inner free diameter of the circumferential wall 41a.

Due to the removable lid plate 41b, lid plates with different sized granulate inlet 42 can be used. The bolting to the rest of the housing of the closure unit 40 is preferably done together with the bolting of the closure unit 40 to a module arranged above it, which is why in this case through holes 49 are provided as connecting elements in both the mounting flange 41b and the lid plate 41b at positions in alignment with each other and in particular of the same size.

The lower granulate outlet 43 is the lower end of the interior enclosed by the peripheral wall 41a.

On the peripheral wall 41a on the right, a filling level sensor 48 is shown in the lower area, which measures a possible level of granulate in the housing 41 through the peripheral wall 41a.

On the peripheral wall 41a on the left-hand side in the upper part, an air filter 47 is shown, which is tightly fitted to an air opening 46 in the peripheral wall 41a and through which a gas, in particular air, flowing out of or into the housing 41 is filtered.

Essential to the invention is the closure element 44 in the form of a closure cone 44, which is arranged in the housing 41 and is adjustable along its axial direction 41', usually the vertical:

Since the closure cone 44, which is in particular rotationally symmetrical and has its tip pointing upwards, has a larger diameter when viewed in plan view than the round granulate inlet opening 42 in the lid plate 41d, the closure cone 44 closes this granulate inlet opening 42 according to FIG. 1a when it is located so far up that its tip projects upwards out of the granulate inlet opening 42 and its conical surface lies tightly against the inner circumferential surface of the granulate inlet opening 42, the lower circumferential edge of which may preferably be slightly slanted for this purpose.

In order to ensure such a tight fit at the appropriate height of the closure cone 44, the latter can be pivoted about all horizontal directions, i.e. transversely to the axial direction 41', in particular by resting with a recess open at the bottom, which has an approximately hemispherical, correspondingly upwardly pointing base, on a ball 45 fitting into this recess and having a radius similar to that of its base, which forms the cone base 45.

The ball 45 is preferably mounted on the upper end of a piston rod 51 protruding from a pneumatic cylinder 50, which is tightly slidable in cylinder 52, extending in the axial direction 41' and located in the housing 41 under the closure cone 44, and communicating with a compressed air connection 53 in the peripheral wall 41a of the housing.

By applying compressed air, the piston rod 51 and thus the closure cone 44 is moved upwards until it contacts the granulate inlet opening 42, and by venting it, the latter sinks downwards under the force of gravity into the open position, in which preferably also the upward pointing tip of the closure cone 44 is located inside the housing 41, as shown in FIG. 1c.

The design of the closure element 44 with its tip pointing upwards, i.e. in particular as a cone, prevents granulate from accumulating on the surface of the closure element 44, especially when it is open.

In the mounting flanges 41b, c several vertically extending through openings 49 are arranged as connecting elements 49 distributed around the circumference, in particular all on the same circle, which is in particular concentrically arranged around the longitudinal centre 41" of the housing 41.

FIGS. 2a, b show the closure unit 40 mounted—corresponding to the gravity-induced flow direction 10 of the granulate 4—under a granulate separator and dust extractor 1, so that the granulate 4 can fall from the granulate outlet opening 8 of the dust extractor 1 and the granulate inlet opening 42 of the closure unit 40, which is located directly underneath it, and which is also the same size in this case and is generally circular when viewed from above, can fall into the interior of the housing 41 of the closure unit 40, if this opening 8 or 42 is open, as shown in FIG. 2b.

Only closure unit 40 has a closure element for this, not the deduster 1.

The closure cone 44 of the closure unit 40 is located completely below these openings in the open state and thus completely in the height range of the circumferential wall 41a, so that the granules 4 falling into the closure unit 40 fall onto the tip or the conical surfaces of the closure cone 44 and slide further down from there.

As can be better seen in FIG. 2a—in which the closure cone 44 is raised so far that it closes the granulate inlet opening 42 of the closure unit 40 and thus the passage between deduster 1 and closure unit 40—the deduster 1 initially comprises a dedusting container 9 in the form of an upright cylinder, usually made of glass, which is closed at the top and bottom by corresponding parts, usually made of metal.

In the upper area of the dedusting container 9, the inlet socket 18, which is guided through from the side and bent downwards with its free end, opens out in the upper area. The free opening of the inlet socket is the granulate inlet opening 7 of the deduster 1, through which the conveying air 3 including the granulate 4 conveyed by it, but also the dust 11 contained therein, is supplied in the direction of flow 10.

In the lower part of the dedusting container 9, i.e. in its wall, there is a gas supply opening 21, through which ionised gas 19 is supplied. This is usually air, which is supplied via a compressed air connection 22 and flows along an ionizing tip, which is part of an ionizer 20 located outside the dedusting container 9.

A filling level sensor 13 is also located in the lower area on the outside of the wall of the dedusting container 9, which emits a signal as soon as a pile of granulate 4 has built up from below until it reaches the filling level sensor 13.

The lower open end of the glass cylinder, which forms the dedusting container 9, is closely followed by the outlet cone 16, into whose inner cone surface 16', which narrows from top to bottom, the orifices of so-called whirl nozzles 17 open, into which compressed air can be injected via a compressed air connection 22 to whirl up a granulate 4 located in the lower area of the dedusting container 9.

The whirl nozzles 17 are preferably directed upwards, i.e. at an angle which deviates from the vertical direction by a maximum of 45°, better by 30° at the most, better by 20° at the most, better by 10° at the most, in order to avoid the impact of the granules on the side walls of the dust collector as far as possible.

At the upper end, the upper air outlet 12 of the dedusting container 9 is closed by a lid 15, which contains a sieve 5, which can be penetrated by air and dust 11, but not by the granules of the granulate 4. This air outlet opening 12 is connected to a socket for discharging the exhaust air 6 loaded with dust 11, which is sucked off through the sieve 5 by means of a vacuum generated by an ejector compressed air nozzle 14 located downstream of the sieve 5 in the socket as a vacuum generator, supplied with compressed air again via a compressed air connection 22.

The dust-laden exhaust air 6 is fed to a dust collection container not shown and a filter there as a dust collector.

All moving parts as well as all valves and/or nozzles of the deduster and especially of the entire treatment unit are controlled by an electric control 2.

From the lower end of the outlet cone 16 a ring-shaped, plate-shaped flange protrudes outwards, which is placed on the lidplate 41*d* of the closure unit 40.

In it there are through openings 23 as connecting elements 23 of the deduster 1, preferably in the same circumferential and radial position as the through openings 49 as connecting elements 49 at the top of the closure unit 40, so that both screws can be inserted through them and the two modules can be tightly connected to each other.

Such connecting elements 23/49 of the deduster 1 on the one hand and/or the closure unit 40 on the other hand may be of different construction or may lie on different radial positions or circumferential positions and thus represent two different types of connecting elements, as shown in FIG. 1*b* lying on two different concentric circles or in the form of an oblong hole, either radially or circumferentially as shown.

In this way, the granule outlet opening 8 of the deduster 1 can be closed until a batch 4' of granules 4 is filled in via the granule inlet opening 7, and the granule supply is stopped as soon as the filling level sensor 13 emits a corresponding signal and then this batch is dedusted by swirling it up for a defined time and with a defined pressure and volume flow from the whirling nozzles 17 with a simultaneous negative pressure at the upper air outlet opening 12.

FIGS. 3*a, b* show a treatment unit which, in addition to the deduster 1 and the closure unit 40 mounted underneath it—as shown in FIGS. 2*a, b*—also includes a granulate dryer 30, which is mounted under the closure unit 40.

This entire treatment unit is mounted on a consumer 100—here the inlet to its conveying channel 101, in which a screw conveyor 102 is located—so that the granulate separated and dedusted from the air flow in deduster 1 first falls under the force of gravity into the closure unit 40—when the passage in between is released by the closure element 44 as shown in FIG. 3*b*—and from there further into the granulate dryer 30 and consumer 100.

Of the granulater dryer 30, only the sleeve-shaped housing 31 with the upper granulate inlet opening 32 which in this case is identical to the granulate outlet opening 43 of the closure unit 40 located above it—and the lower granulate outlet opening 33 as well as the annular mounting flanges, which also here extend radially outwards from the upper and lower end of the sleeve-shaped housing 31 in each case, in which connecting elements 34, here again in the form of screw openings 34, are located for connection to modules arranged above and below it.

While in FIG. 3*a* the screw openings 34 in the lower mounting flange are aligned with screw openings in the consumer 100 located below, this is not the case in the illustration in FIG. 3*b*, but the screw openings of the consumer are located on a circle with a larger diameter than that of the granulate dryer 30 and possibly also at other circumferential positions.

For this reason, FIG. 3*b* shows an adapter (70) between the granulate dryer (30) and the consumer (100), in particular an annular adapter, which has screw openings to match both the component above and below:

Matching the screw connection openings of the consumer 100, this adapter 70 preferably has screw connection openings in the same circumferential position and radius, preferably as through-openings without thread.

Matching the lower screw openings 34 of the granulate dryer 30, threaded blind holes, preferably open at the top, are arranged in the adapter 70, i.e. at the same circumferential position and in the same radial position as well as in one size so that screws can be inserted through the screw openings 34 of the granulate dryer 30 and adapter 70 can be screwed into the threaded blind hole.

FIG. 3*a* also shows a suction lance 24, connected to the granulate inlet nozzle 18, in which a flow generator 90 in the form of an ejector compressed air nozzle 14 is arranged in order to be able to suck granulate 4 from a granulate supply (not shown).

Analogous to FIGS. 2*a, b*, also in FIGS. 3*a, b* the closure unit 40 in FIG. 3*a* is shown in closed and in FIG. 3*b* in open condition.

FIGS. 4*a, b* show a treatment unit that does not include either a granulate dryer 30 or a closure unit 40 and thus no closure element 44.

Thus, the granulate 4 can fall from the permanently open lower granulate outlet 8 of the deduster 1 directly into the consumer 100, on which it is directly mounted in FIG. 4*a*.

In FIG. 4*b*, on the other hand, between deduster 1 and consumer 100, an surge tank 80 as an intermediate container is mounted, which consists only of a cylindrical peripheral wall and, at its upper and lower ends, radially outwardly projecting annular mounting flanges with fastening elements such as screw openings.

This creates an additional buffer space for granulate between the lower granulate outlet 8 of deduster 1 and the inlet to consumer 100, which may be necessary, for example, because the consumer works in batches and the quantity of granulate 4 stored in its conveyor channel 101 is not sufficient for such a batch.

FIG. 4*c* differs from FIG. 4*b* in that there is a closure unit 40 directly below deduster 1 and thus between deduster 1 and intermediate tank 80.

The treatment unit is usually assembled in this combination if the volume of granulate inside the housing of the closure unit 40 is not sufficient for the consumer 100, and is to be increased by the additional volume of the intermediate tank 80.

REFERENCE SIGN LIST

1 Deduster, dust extractor
2 Control system
3 Conveying air
4 Granulate, granulate collection, granulate grain
4' Batch 5 Sieve
6 Exhaust air
7 Granulate inlet opening
8 Granulate outlet opening
9 Dedusting container
10 Direction of flow
11 Dust
12 Air outlet opening
13 Filling level sensor
14 Ejector compressed air nozzle, vacuum generator
15 Lid
16 Outlet cone
16' Cone surface
17 whirling nozzle
18 Inlet socket
19 ionised gas
20 Ionizer
21 Gas supply opening
22 Compressed air connection
23 Connecting element, through-hole
24 Suction lance
30 Granulate dryer
31 Housing
32 Granulate inlet opening
33 Granulate outlet Opening
34 Connecting element
40 Closure unit
41 Housing
41' Axial direction, vertical direction
41" Longitudinal centre
41a Perimeter wall
41b, c Mounting flange
41d Lid plate
42 Granulate inlet opening
43 Granulate outlet opening
44 Closure element, closure cone
45 Closure element base, cone base
46 Air opening
47 Air Filter
48 filling level sensor
49 Connecting element, through-hole
50 Pneumatic cylinder
51 Piston rod
52 Cylinder
53 Compressed air connection
70 Adapter
80 Intermediate tank
90 Conveyor flow generator
100 Consumer
101 Conveyor channel
102 Screw Conveyor

The invention claimed is:

1. A kit for creating a treatment unit for granulate (4), the kit comprising the following modules:
a) a closure unit (40) for a stream of granules flowing through, the closure unit comprising:
a housing (41),
a granulate inlet opening (42) for the granulate (4) in the upper part of the housing (41), in particular in its lid plate (41d),
a granulate outlet opening (43) in the lower part of the housing (41),
a closure element (44) in the housing (41), that can close a granulate flow opening, in particular the granulate inlet opening (42) or a granu-late outlet opening of a component located above it, in particular from its underside, and
connecting elements (49), in particular through-holes (49), in the upper region of the housing (41) for connection to a component arranged above the housing, and
connecting elements (49), in particular through-holes, in the lower region of the housing for connection to a component arranged below the housing,
b) a dust extractor (1) for removing dust from a granulate (4), in particular in batches, with
a dedusting container (9) comprising
at least one granulate inlet opening (7) for the granulate (4),
a granulate outlet opening (8) in the lower part of the dedusting container (9), in particular in its bottom,
connecting elements (23), in particular screw openings (23), in the lower region of the dust removal container (9) for connection to a component arranged below it, in particular a closure unit (40),
an air outlet opening (12), which is arranged in particular in the upper part of the dedusting container (9),
an ionizer (20),
a whirling unit for whirling up the granulate (4) in the dedusting container (9),
c) a control system (2) capable of controlling the whirling unit and all moving parts, in particular valves, of the dust extractor (1),
d) a granulate dryer (30), wherein the granulate outlet opening (43) of the closure unit (40) and a granulate inlet opening (32) of the granulate dryer (30) are arranged in such a way that, when the closure element (40) is mounted directly one on top of the granulate dryer (30) by means of the connecting elements, in particular screw openings, present on both sides, the granulate outlet opening (43) of the closure unit (40) lies within the granulate inlet opening (32) of the granulate dryer (30), in particular concentrically thereto or congruently thereto,
wherein the modules are specifically designed for free mutual combinability in at least the following configurations:
the dust extractor (1) being mounted on top of the closure unit (40) with the closure unit (40) being mounted on top of the granulate dryer (30),
the dust extractor (1) being mounted on top of the granulate dryer (30) without the closure unit (40) being mounted therebetween,
the granulate dryer (30) being mounted on top of the closure unit (40).

2. The kit according to claim 1,
characterized in that
the granulate outlet opening (8) of the dust extractor (1) and the granulate inlet opening (42) of the closure unit (40) are arranged in such a way that when the dust extractor (1) and closure unit (40) are mounted one on top of the other wherein the connecting elements (23, 49) are provided on both sides, in particular screw openings, the granulate outlet opening (8) of the dust extractor (1) and the granulate inlet opening (42) of the closure unit (40) are arranged concentrically, in particular in alignment, one above the other.

3. The kit according to claim 1
characterized in that
the kit comprises, as a further module, an adapter (70), in particular a plate-shaped, in particular ring-shaped adapter, with a vertically open passage opening and in particular an axial height as low as possible in the passage direction of the passage opening in order to be able to mount the adapter (70) between two modules of the modular system or to be able to mount a module of the modular system, in particular the granulate dryer (30), on a consumer (100), in that the adapter (70) has two types of connecting elements, one type of which is construed to cooperate with the connecting elements of the module standing on it and the other type of which is construed to cooperate with the connecting elements of the module below it or the load (100).

4. The kit according to claim 1 characterized in that the kit comprises as a further module a surge tank (80) with a vertically open passage opening in order to be able to mount the surge tank (80) between two modules of the modular system or to be able to mount a module of the modular system, in particular the granulate dryer (30), on a consumer (100), in that the surge tank (80) has, in particular, two types of connecting elements, one type of which is designed to cooperate with the connecting elements of the module placed thereon and the other type of which is constructed to cooperate with the connecting elements of the module placed underneath or the consumer (100).

5. The kit according to claim 1 characterized in that the kit contains a conveying flow generator (90), which can be arranged, in particular upstream of the dedusting container (9), in particular in the form of an ejector compressed air nozzle (14) with a compressed air connection, which is arranged in particular in a suction lance (24).

6. The kit according to claim 1 characterized in that the kit comprises a dust separator, in particular with an exhaust air filter and/or a vacuum generator, in particular an ejector compressed air nozzle (14), which can be arranged in particular downstream of the dedusting container (9).

7. The kit according to claim 1 characterized in that the dust extractor (1) does not comprise a closure element for closure its granulate outlet opening (8), such that it is free of a closure, the peripheral walls surrounding the dedusting container (9) consist of an electrically non-conductive material, in particular glass, at least on the inner surfaces facing the interior.

8. The kit according to claim 1 characterized in that the whirling unit has upwardly directed whirling nozzles (17), which are connected to a compressed air connection, in the lower part of the dedusting container (9), in particular in or near the granulate outlet opening (8) of the dust extractor (1).

9. The kit according to claim 1 characterized in that the cross-section of the dedusting container (9) decreases in the lower part towards the granulate outlet opening (8) of the dust extractor, in particular by means of at least one conical surface (16'), the whirling nozzles (17) are arranged in the conical surface (16'), in particular, the whirl nozzles (17) are directed upwards at an angle deviating from the vertical direction by not more than 45°, better by not more than 30°, better by not more than 20°, better by not more than 10°.

10. The kit according to claim 1 characterized in that the whirling nozzles (17) are controllable with respect to pressure and/or flow velocity and/or flow volume, in particular are controllable by the control system (2).

11. The kit according to claim 1 characterized in that the ionizer (20) comprises an ionizing tip which is arranged in the free end region of an air supply line and projects into a gas supply opening (21) in the wall of the dedusting container (9) or even into the interior of the dedusting container (9) so that it is swept over in particular by the flowing air.

12. The kit according to claim 1 characterized in that the gas supply opening (21) with the ionizer (20) connected thereto is arranged in the lower region of the dedusting container (9), in particular above the outlet cone (16).

13. The kit according to claim 1 characterized in that the air outlet opening (12) is covered by an easily removable sieve (5) or is permanently and in particular completely open.

14. The kit according to claim 1 characterized in that the height of the dedusting container (9) is at least 100 mm, better at least 200 mm, better at least 300 mm, better at least 400 mm.

15. The kit according to claim 1 characterized in that the peripheral wall of the dedusting container (9) is an upright glass tube open at the top and bottom, in particular with a rotationally symmetrical cross-section, and the cross-section is unchanged, in particular over the entire length.

16. The kit according to claim 1 characterized in that the granulate inlet opening (7) of the dust extractor (1) is arranged in the upper half, in particular in the upper third, of the height of the dedusting container (9).

17. The kit according to claim 1 characterized in that the whirling-up nozzles (17) together with the control (2) are capable of generating such an upwardly directed counterflow that the granules (4) whirled up thereby terminate their upward movement by gravity for the most part before they reach the upper air outlet opening (12).

18. The kit according to claim 1 characterized in that the control system (2) has operating modes for batch operation and continuous operation and the control system (2) can be switched between these two operating modes.

19. The kit according to claim 1 characterized in that the dedusting container (9) has several granulate inlet openings (7), or the dust extractor (1) has a dedusting container (9) with only one granulate inlet opening (7) and a conveying line which has a branching outside the dedusting container (9).

20. The kit according to claim 1
characterized in that
the control system (2) of the dust extractor (1) has signal connections for signal connection to the closure unit (40), in particular its control.

21. The kit according to claim 1
characterized in that
the control system (2) of the dust extractor (1) comprises a shredder control for emptying the collecting container of a shredder in which waste parts from an injection molding machine are shredded and fed to the granulate inlet opening (7) of the deduster (1).

22. The kit according to claim 1, characterized in that
the closure element (44) is an upwardly projecting closure element (44), in particular a closure cone (44), which in the closure state projects upwards out of the housing (41) through the upper granulate inlet opening (42),
the closure element (44), in particular the closure cone (44), is mounted pivotably about at least one horizontal axis, preferably about two intersecting horizontal axes, on a component supporting it, in particular a closure element base (45).

23. The kit according to claim 1, characterized in that
the housing (41) of the closure unit (40) has peripheral walls and an upper and a lower mounting flange (41b, c) at which the connecting elements (49) are arranged
or
an air opening (46) in the housing (41), in particular in its peripheral wall (41a), which is fluidically connected to an air filter (47), is attached in particular to the outside of the housing (41).

24. The kit according to claim 1, characterized in that
the closure unit (40) of the closure unit (40) has an electronic control for the closure element (44),
wherein this control has signal-technical connections, in particular for connection to another control.

\* \* \* \* \*